Nov. 29, 1966     P. N. TOWNSEND ETAL     3,288,215

WELL TREATMENT TO INCREASE WATER INJECTIVITY

Filed Aug. 1, 1963

Percy N. Townsend &
Victor G. Meadors
      INVENTORS.

BY Gary C. Honeycutt
      ATTORNEY

United States Patent Office 3,288,215
Patented Nov. 29, 1966

3,288,215
WELL TREATMENT TO INCREASE WATER INJECTIVITY
Percy N. Townsend and Victor G. Meadors, Tulsa, Okla., assignors, by mesne assignments, to Esso Production Research Company, a corporation of Delaware
Filed Aug. 1, 1963, Ser. No. 299,214
8 Claims. (Cl. 166—42)

This invention relates to a chemical treatment of water injection wells and brine disposal wells in order to improve the permeability of the surrounding formation with respect to water or brine.

When an injection well is drilled into an oil-bearing formation, or when an oil-producing well is converted into an injection well, there is usually a considerable oil saturation in the immediate vicinity of the borehole. The presence of this oil reduces the relative permeability of the formation to water or brine and decreases the injectivity or intake capacity of the well. The continued injection of water may displace a considerable portion of this oil in the vicinity of the borehole, but a significant fraction of the oil will remain in place. In addition to the adverse effect of liquid phase oil saturation, the problem is frequently aggravated by the precipitation of waxes, tars and asphaltic materials in the formation during its earlier production history.

Numerous methods of alleviating or eliminating such conditions have been suggested, many of which have been used; but a completely satisfactory method has not been developed heretofore. For example, oleophilic solvents including propane, butane, gas oil distillate and kerosene have been injected into the well. These have the disadvantage of remaining within the vicinity of the wellbore, if liquid, thereby reducing the relative permeability to water in the same way as did the original oil. On the other hand, if the selected solvent is gaseous at reservoir conditions then the injection must be made at a pressure considerably higher than the reservoir pressure, which is usually undesirable.

Solvents such as acetone and isopropanol have also been suggested for cleaning formations surrounding injection wells. These solvents are miscible with water but they have a limited solubility in crude oil and are incompatible with most formation brines. Therefore, they tend to precipitate asphaltenes and tarry material from crude oil, and also to precipitate salts from the formation brine. This precipitation also causes a loss of injectivity and may even plug parts of the producing formation completely.

It is a generally accepted fact that the most efficient displacement of one or more fluids by another in a porous permeable medium results when the displacing fluid is miscible with the fluid or fluids being displaced. Thus an ideal solvent for treating an injection well to remove oil, waxes, tars and asphalts must readily dissolve these materials, and in addition must be miscible with water and compatible with brine. But the ideal solvent has not been discovered.

In accordance with the present invention a miscible displacement of oil, waxes, tars and asphalts is achieved, without the precipitation of salts, by first replacing the formation brine in the vicinity of the wellbore with a selected solvent. Subsequently, the first solvent and the remaining petroliferous materials are removed by miscible displacement with a second solvent.

The preferred solvent for replacing formation brine in the initial stage of the treatment is 1,5-pentanediol, or an aqueous solution thereof containing at least 50% of the diol by volume. This material is capable of displacing water and oilfield brines without precipitating salts, but is substantially ineffective in removing crude oil. Preferably the concentration of water added to the diol is selected in accordance with the desired viscosity of the solution. The viscosity can be varied from about 90 cps. for the pure diol, to about 6 cps. for the 50% aqueous solution of diol.

Other solvents which are useful, but not necessarily equivalent, for replacing brine in the initial stage of the process include 2,2'-thiodiethanol, 2-methyl-2,4-pentanediol, 1,6-hexanediol, 2,5-hexanediol, dipropylcarbonate, 2,2-dimethyl-1,3-propanediol, 2,2,4-trimethyl-1,3-propanediol, resorcinol, 1,5-pentanediamine, 2,4-hexanediamine, 2,2,4-trimethyl-1,3-propanediamine, and 2-methyl-1,4-butanediamine. Still other solvents may be found useful for purposes of the invention, in addition to these. The minimum requirements of the first stage solvent is a partial miscibility with water and a "compatibility" with brine, which means that it must not cause a precipitation of salts dissolved in the brine being displaced.

The preferred solvent for the second stage of the treatment is 2-amino-2,4,4-trimethylpentane, more commonly known as tertiary octylamine. Other suitable liquids include 2-butanone, isopropanol, and 3-pentanol. The tertiary octylamine is particularly suitable because of its relatively high degree of miscibility with both water and crude oil, and because of its greater ability to dissolve waxes, tars and asphaltic materials.

Other second stage solvents are useful, but not necessarily equivalent, including t-amylamine, n-amylamine, β-ethylbutylamine, isoamylamine, 2-(β-butoxyethoxy) ethanol, morpholine, 1,4-dioxane and piperazine. Still other second stage solvents may be found suitable. The essential properties which the solvent must have are a substantial miscibility with the first stage solvent and with oil. It should also have the ability to dissolve waxes, tars and asphaltic materials.

The volume of solvent required in each stage of the treatment is related to the porosity of the formation in the vicinity of the well. Some benefit is derived from the injection of as little as 0.1 pore volume, based on the formation lying with a 10 ft. radius of the wellbore. Preferably, at least 0.5 pore volume of solvent is injected in each stage of the treatment. From an economic viewpoint, the optimum volume usually falls within the range of one to three pore volumes.

In cases where the injection water is highly saline, a third stage of the treatment becomes necessary, in order to prevent a precipitation of salts upon beginning or resuming the injection of brine. A most convenient material to inject for this purpose is the 1,5-pentanediol of the initial stage. Fresh water is also suitable, if a sufficient volume is available.

Figure 1:
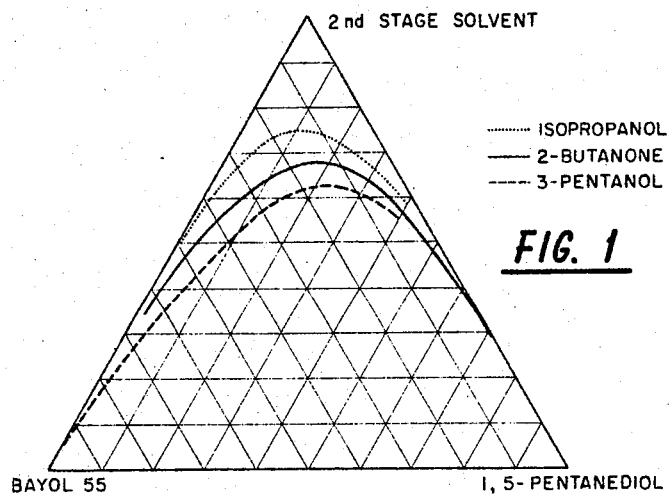
FIGURE 1 is a ternary phase diagram showing the relative miscibilities of various second stage solvents with oil and 1,5-pentanediol at 25° C.

Referring to FIGURE 1, the dotted curve represents the ternary system consisting of isopropanol, 1,5-pentanediol and Bayol 55. Bayol 55 is a highly refined, paraffinic petroleum white oil. The solid curve represents the ternary system consisting of 2-butanone, 1,5-pentanediol and oil. The dashed curve represents the ternary system consisting of 3-pentanol, 1,5-pentanediol and oil. There is a substantial degree of miscibility in each system, which includes all mixtures having concentrations of second stage solvent, oil, and diol represented by that area of the diagram which lies above the curve for each system. Below the curve lie those concentrations which produce a two-phase system. In essence, therefore, the curves of FIGURE 1 demonstrate that each second stage solvent is capable of miscibly displacing both oil and 1,5-pentanediol.

Figure 2:
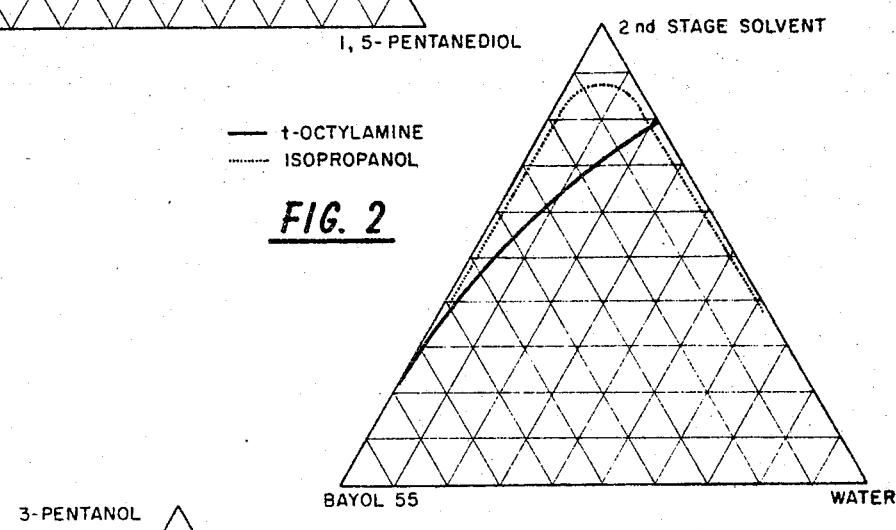
FIGURE 2 is a ternary phase diagram showing the relative miscibilities of tertiary octylamine and isopropanol, respectively, with water and oil at 25° C.

In FIGURE 2, the dotted curve represents the ternary system consisting of isopropanol, water and oil. The solid curve represents the ternary system consisting t-octylamine, water and oil. As before, it is apparent that an area of miscibility occurs at high concentrations of second stage solvent. The curves of FIGURE 2 demonstrate the ability of each second stage solvent to achieve miscible displacement of oil and small amounts of water. Teritary octylamine is shown to be a preferred solvent for the second stage of the treatment.

Figure 3:
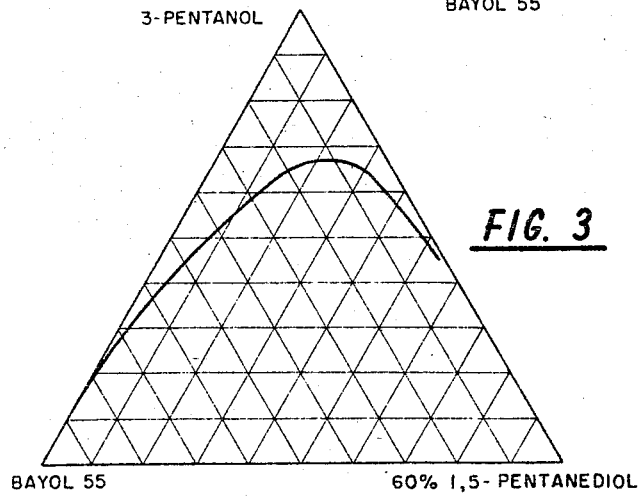
FIGURE 3 is a ternary phase diagram showing the miscibility at 25° C. of 3-pentanol with oil and 60% pentanediol by volume (in water).

In FIGURE 3 the curve represents the ternary system consisting of 3-pentanol, oil, and a 60% aqueous solution of 1,5-pentanediol. By a comparsion of FIGURE 3 with the dashed curve of FIGURE 1, it becomes apparent that high concentrations of water do not materially reduce the area of miscibility characterisic of the system comprising 3-pentanol, 1,5-pentanediol and oil. Thus, FIGURE 3 demonstrates the feasibility of using aqueous solutions of 1,5-pentanediol to replace brine in the initial stage of the treatment, as mentioned earlier.

A more complete understanding of the method may be obtained from a consideration of the following tests, which demonstrate the effectiveness of the invention.

*Example I*

Torpedo sandstone with a porosity of 24.5 percent and a permeability to brine of 1632 md. was used for the test. The test sample was a cylinder 8.8 cm. in length and 2.5 cm. in diameter.

The test sample was first saturated with brine and was then flooded with several pore volumes of Loudon crude to establish connate water. The final connate water saturation was 32.7 percent. The test sample was then waterflooded with 15 pore volumes of a synthetic brine containing about 80,000 p.p.m. of salts. The total pressure drop across the core was 20 p.s.i. At the end of the waterflood the oil saturation was 17.3 percent of the pore volume. The water saturation was 82.7 percent of the pore volume, and the permeability to brine was only 356 md. In this condition the test sample approximates a piece of rock in the vicinity of the borehole of either a water injection well or a completely watered out well (which might be converted into an injection well).

The test sample was then treated as follows:

(1) A pore volume of 50 percent aqueous 1,5-pentanediol was injected at a total pressure drop of 20 p.s.i. The diol displaced brine and a trace of oil.

(2) A pore volume of 2-amino-2,4,4-trimethylpentane (commonly known as tertiary octylamine or t-octylamine) was then injected at 20 p.s.i., displacing most of the diol and some residual oil.

(3) A pore volume of brine was injected at 20 p.s.i. The injection pressure was then lowered to 10 p.s.i. and the permeability of the core to brine was measured at intervals, with the following results:

| Cumulative Brine Input After Treatment, Pore Volumes | Permeability to Brine, md. | Percent Increase in Permeability Due to Treatment |
|---|---|---|
| 6.7 | 529 | 48.4 |
| 15.1 | 663 | 86.2 |
| 23.6 | 675 | 89.6 |
| 36.4 | 677 | 90.2 |

This constitutes almost a twofold increase in permeability to brine and, in an injection well, this would almost double the injection capacity of the well.

*Example II*

This test was carried out on another piece of Torpedo sandstone with the same dimensions and characterisics as the one used in the first test.

The test piece was first saturated with brine and the permeability to brine was found to be 1632 md. The test sample was then flushed with Loudon crude to establish connate water. The final connate water content was 28.6 percent. The test sample was then waterflooded with about 15 pore volumes of brine at an over-all pressure drop of 20 p.s.i. At the end of the waterflood, the residual oil saturation was 19.0 percent P.V., the water saturation was 81.0 percent P.V., and the permeability to brine was constant at 305 md.

The test sample was then subjected to the following treatment:

(1) One pore volume of a 50 percent aqueous solution of 1,5-pentanediol was injected into the rock at 20 p.s.i. Brine and a trace of oil were displaced.

(2) Two pore volumes of t-octylamine were injected into the test rock at an over-all pressure drop of 20 p.s.i. The amine displaced all of the diol and a major portion of the residual oil.

(3) One pore volume of a 50 percent aqueous solution of 1,5-pentanediol was injected at an over-all pressure drop of 20 p.s.i. The diol displaced most of the amine.

(4) One pore volume of brine was injected at 20 p.s.i. Injection of brine was continued at 20 p.s.i. and the permeability to brine was measured at intervals with the following results:

| Cumulative Brine Throughput After Treatment, P.V. | Permeability to Brine, md. | Percent Increase in Permeability Due to Treatment |
|---|---|---|
| 4.7 | 938 | 207 |
| 9.4 | 948 | 211 |
| 15.9 | 980 | 221 |
| 28.2 | 984 | 222 |
| 36.1 | 989 | 224 |
| 44.4 | 993 | 225 |

This treatment, which used twice as much material as the first, gave a better-than-threefold increase in permeability to brine.

These two tests conclusively demonstrate the effectiveness of the process under simulated practical conditions.

What is claimed is:

1. A method of removing brine, oil and tar from a subterranean formation in the vicinity of a borehole in the earth, which comprises injecting 1,5-pentanediol through said borehole into said formation, and thereafter injecting into said formation a solvent selected from the group consisting of tertiary octylamine, 3-pentanol, 2-butanone and isopropanol.

2. A method of removing brine, oil and tar from a subterranean formation in the vicinity of a borehole in the earth, which comprises injecting 1,5-pentanediol through said borehole into said formation, and thereafter, injecting into said formation a solvent selected from the group consisting of tertiary octylamine, 3-pentanol, 2-butanone and isopropanol; the volume of solvent injected in each stage of the method being not less than 0.5 pore volume, based on a 10 ft. formation radius from the wellbore.

3. A method of removing brine, oil and tar from a subterranean formation in the vicinity of a borehole in the earth, which comprises injecting through said borehole into said formation an aqueous solution of 1,5-pentanediol to displace the brine, and thereafter injecting into said formation tertiary octylamine to remove the oil, tar and diol by miscible displacement.

4. A method as defined by claim 3 wherein said solution contains at least 50% diol by volume.

5. A method of removing brine, oil, wax and tar from a subterranean formation in the vicinity of a borehole in the earth, which comprises injecting through said borehole into said formation an aqueous solution of 1,5-pentanediol to displace the brine, thereafter injecting into said formation tertiary octylamine to remove the oil, tar, wax and diol by miscible displacement, and then injecting into said formation additional 1,5-pentanediol.

6. A method as defined by claim 5 wherein said solution contains at least 50% diol by volume.

7. A method for increasing the permeability to water of a subterranean oil-bearing formation in the vicinity of the wellbore, which comprises injecting into the formation via said wellbore a first solvent miscible with brine, and thereafter injecting into said formation a second solvent selected from the group consisting of tertiary octylamine, 3-pentanol, 2-butanone, isopropanol, t-amylamine, n-amylamine, β-ethylbutylamine, isoamylamine, 2-(β-butoxy-ethoxy) ethanol, morpholine, 1,4-dioxane, and piperazine.

8. A method for increasing the permeability to water of a subterranean oil-bearing formation in the vicinity of a wellbore which comprises injecting into the formation via said wellbore a first solvent selected from the group consisting of 1,5-pentanediol, 2,2'-thiodiethanol, 2-methyl-2,4-pentanediol, 1,6-hexanediol, 2,5-hexanediol, dipropylcarbonate, 2,2-dimethyl-1,3-propanediol, 2,2,4-trimethyl-1,3-propanediol, resorcinol, 1,5-pentanediamine, 2,4-hexanediamine, 2,2,4-trimethyl-1,3-propanediamine, and 2-methyl-1,4-butanediamine, and thereafter injecting into said formation a second solvent which is miscible with the first solvent and also miscible with oil.

References Cited by the Examiner

UNITED STATES PATENTS

| | | | |
|---|---|---|---|
| 2,345,713 | 4/1944 | Moore et al. | 166—42 |
| 3,101,781 | 8/1963 | Connolly | 166—9 |
| 3,163,213 | 12/1964 | Bernard | 166—9 |

JACOB L. NACKENOFF, *Primary Examiner.*

CHARLES E. O'CONNELL, *Examiner.*

T. A. ZALENSKI, S. J. NOVOSAD, *Assistant Examiners.*